(12) United States Patent
Maret et al.

(10) Patent No.: US 10,498,455 B2
(45) Date of Patent: Dec. 3, 2019

(54) EMITTER WITH M-PAM MODULATION FOR WIRELESS OPTICAL COMMUNICATION SYSTEM

(71) Applicant: COMMISSARIAT A L'ENERGIE ATOMIQUE ET AUX ENERGIES ALTERNATIVES, Paris (FR)

(72) Inventors: Luc Maret, Polienas (FR); Marc Laugeois, Grenoble (FR); Xavier Popon, Seyssins (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/006,190

(22) Filed: Jun. 12, 2018

(65) Prior Publication Data

US 2018/0359034 A1 Dec. 13, 2018

(30) Foreign Application Priority Data

Jun. 12, 2017 (FR) .................................... 17 55219

(51) Int. Cl.
| | |
|---|---|
| *H04B 10/11* | (2013.01) |
| *H04B 10/516* | (2013.01) |
| *H04B 10/116* | (2013.01) |
| *H04B 10/50* | (2013.01) |
| *H04B 10/114* | (2013.01) |

(52) U.S. Cl.
CPC ....... *H04B 10/5161* (2013.01); *H04B 10/114* (2013.01); *H04B 10/116* (2013.01); *H04B 10/502* (2013.01); *H04B 10/11* (2013.01)

(58) Field of Classification Search
CPC ............. H04B 10/5161; H04B 10/114; H04B 10/116; H04B 10/502; H04B 10/11
USPC ................................... 398/118–131, 182–201
See application file for complete search history.

(56) References Cited

U.S. PATENT DOCUMENTS

| | | | |
|---|---|---|---|
| 6,424,444 B1 * | 7/2002 | Kahn ................. | H04B 10/5161 398/141 |
| 7,546,038 B2 * | 6/2009 | Wang ................. | H04B 10/1141 398/118 |
| 9,882,532 B1 * | 1/2018 | Vera Villarroel ..... | H03F 1/0222 |
| 9,933,639 B1 * | 4/2018 | Lin ........................ | G02F 1/025 |
| 10,084,619 B2 * | 9/2018 | Dupuis ............. | H04L 25/03076 |

(Continued)

FOREIGN PATENT DOCUMENTS

CN 103986516 8/2014

OTHER PUBLICATIONS

Quadir et al, A 56Gbs PAM 4 VCSEL driver circuit, Jun. 2012, ISSC, All Document. (Year: 2012).*

(Continued)

*Primary Examiner* — Dibson J Sanchez
(74) *Attorney, Agent, or Firm* — Oblon, McClelland, Maier & Neustadt, L.L.P.

(57) ABSTRACT

This invention relates to an emitter for an optical communication system such as a Li-Fi system. This emitter comprises an M-PAM modulator and a conversion module to convert an M-PAM symbol into a plurality of logical outputs. It also comprises a plurality of branches in parallel, each branch comprising a switched current source mounted in series with the optical source, each switched current source being controlled by a logical output from the conversion module.

12 Claims, 4 Drawing Sheets

(56) References Cited

U.S. PATENT DOCUMENTS

| | | | | |
|---|---|---|---|---|
| 2001/0035997 | A1* | 11/2001 | Agazzi | H03M 1/0604 398/141 |
| 2004/0091270 | A1* | 5/2004 | Choi | H04B 10/1149 398/130 |
| 2005/0147418 | A1* | 7/2005 | Gurusami | H04L 25/49 398/202 |
| 2008/0002988 | A1* | 1/2008 | Cheng | H04B 10/504 398/182 |
| 2012/0087677 | A1* | 4/2012 | Jang | H04B 10/116 398/183 |
| 2012/0173290 | A1* | 7/2012 | Collins | G06Q 40/08 705/4 |
| 2012/0183290 | A1* | 7/2012 | Schunk | G02B 6/4206 398/43 |
| 2013/0195464 | A1* | 8/2013 | Fath | H04B 10/114 398/96 |
| 2014/0255037 | A1* | 9/2014 | Shang | H04L 27/01 398/115 |
| 2014/0321864 | A1* | 10/2014 | Bliss | H04B 10/541 398/186 |
| 2015/0071651 | A1* | 3/2015 | Asmanis | H04B 10/524 398/141 |
| 2015/0263812 | A1* | 9/2015 | Tatsumi | H04B 10/505 398/189 |
| 2016/0062207 | A1* | 3/2016 | Bai | G02F 1/225 |
| 2016/0156417 | A1 | 6/2016 | Tanaka | |
| 2016/0164604 | A1 | 6/2016 | Liu et al. | |
| 2017/0025816 | A1* | 1/2017 | Tanaka | H04B 10/504 |
| 2018/0035498 | A1* | 2/2018 | Rolindez Alberich | H04B 10/502 |
| 2018/0069542 | A1* | 3/2018 | Bonthron | H03K 7/02 |
| 2018/0356654 | A1* | 12/2018 | Tatsumi | H04B 10/501 |
| 2019/0007141 | A1* | 1/2019 | Kawata | H04B 10/505 |
| 2019/0028204 | A1* | 1/2019 | Nakamura | H01S 5/00 |

OTHER PUBLICATIONS

Li et al, Design of 20 Gbs Four Level Pulse Amplitude Modulation VCSEL Driver in 90 nm CMOS Technology, Aug. 2016, IEEE, All Document. (Year: 2016).*

Lu et al, A 56 Gbs PAM4 VCSEL Based LiFi Transmission With Two Stage Injection Locked Technique, Feb. 2017, IEEE, All Document. (Year: 2017).*

French Preliminary Search Report dated Feb. 27, 2018 in French Application 17 55219 filed on Jun. 12, 2017 (with English Translation of Categories of Cited Documents).

Mohammed M. A. Mohammed, et al., "A Spectrally Efficient Unipolar PAM Single Carrier Frequency Domain Equalization for IM/DD Systems," IEEE, 2015, pp. 246-247.

* cited by examiner

EMITTER WITH M-PAM MODULATION FOR WIRELESS OPTICAL COMMUNICATION SYSTEM

TECHNICAL DOMAIN

This invention relates to the domain of optical wireless communications in general, and particularly to Li-Fi (Light Fidelity) communication systems.

STATE OF PRIOR ART

A great deal of research has recently been made on Optical Wireless Communications (OWC) systems due to their ability to solve the spectral occupancy problem and to complement or even replace Wi-Fi systems.

Schematically, Li-Fi systems are analogous to Wi-Fi systems (respecting IEEE standard 802.11) but use the visible spectrum instead of the RF spectrum. The physical (PHY) layer and the MAC layer of Li-Fi systems have already been standardised in IEEE standard 802.15.7.

FIG. 1 diagrammatically represents an example of a Li-Fi system.

A plurality of light access points (APs) 110, are connected to the principal network 100 using Ethernet links. Each access point is composed of a modem 120 coupled to a LED light source 130 emitting in the visible range, the modem modulating the source power supply current so as to modulate the intensity of the light emitted. The terminals are equipped with a dongle including an optical receiver. This optical receiver receives the light signal, converts it into an electrical signal, demodulates it and recovers the transmitted data. Conversely, the dongle (or the terminal itself) is also equipped with an infrared diode. The data to be transmitted on the uplink then modulate the infrared signal. The infrared signal is received by a photodiode (not shown) mounted on the access point, and is then demodulated to transmit the data to the principal network (Ethernet or other network).

Modulation of optical signals on the uplink and on the downlink is a non-coherent modulation with direct detection at the receiver. Different types of modulation have been disclosed in the literature to take account of the real and single-pole nature of the light signal. Thus, the OOK (On Off Keying), PAM (Pulse Amplitude Modulation), PPM (Pulse Position Modulation), DCO-OFDM (Direct-Current Optical OFDM) and SIM-OFDM (Subcarrier Index Modulation OFDM) modulations have been envisaged.

In particular, the PAM modulation has been recommended on the uplink. Firstly, it has the advantage of reducing energy consumption of the terminal due to the lack of DC polarisation (in particular, unlike the DCO-OFDM modulation). It can then shift equalisation of the channel to the access point end. This equalisation is usually done in the frequency domain, which only requires the insertion of a cyclic prefix at the emitter end. Thus, the terminal calculation resources that can be relatively constrained, are not required. A communication system with M-PAM (PAM with M levels) modulation on emission and equalisation in the frequency domain on reception has thus been disclosed in the paper by M. M. A. Mohammed et al. entitled "A spectrally efficient unipolar PAM single-carrier frequency domain equalization for IM/DD systems" published in 2015 IEEE Proc. of Photonics Conf. (IPC), Reston, Va., pp. 246-247.

FIG. 2 diagrammatically represents the structure of an emitter with M-PAM modulation for an optical wireless telecommunication system.

Data to be emitted (binary words) are modulated by an M-PAM modulator (PAM with M levels), 210. The M-PAM symbols thus obtained are then filtered by a shaping filter 220 and are then converted into an analogue signal by a DAC 230. The purpose of shaping filtering is particularly to reduce interference between adjacent channels. The analogue signal is then amplified (in voltage or in current) by an amplifier 240 before controlling a LED source 250, for example an infrared LED source for the uplink and a white LED source (for example a blue LED with phosphor) for the downlink.

However, the emitter in FIG. 2 has the disadvantage that it requires a digital/analogue converter (DAC).

Patent application CN-A-103986516 describes an emitter of an optical communication system that eliminates the need for such a converter. Data to be transmitted are demultiplexed on a plurality of binary channels, each binary channel performing an OOK modulation (equivalent to a 2-PAM modulation) and switching a corresponding LED source in the visible range. The addition of optical signals at the photodiode emitted in parallel by the different LED sources can simulate an M-PAM modulation. However, this configuration has the disadvantage that it requires one LED source for each modulation level (M) and the emission from these different sources has to be synchronised. Furthermore, it does not function satisfactorily when the characteristics of channels being the different LED sources and the photodiode of the receiver are not identical.

Consequently, the purpose of this invention is to disclose an emitter for an optical communication system, and particularly for the uplink of a Li-Fi system, that is particularly simple and robust, particularly in that it does not require a set of LED sources nor a digital-analogue converter.

PRESENTATION OF THE INVENTION

This invention is defined by an emitter for an optical wireless communication system comprising an M-PAM modulator transforming data to be transmitted into PAM alphabet symbols with M levels in which M>2, and an optical source intended to transmit said data, said emitter comprising:
- a conversion module adapted to convert each M-PAM symbol into a plurality of logical outputs, using a biunivocal conversion table;
- a plurality of branches in parallel, each branch comprising a switched current source, mounted in series with the optical source, each switched current source being controlled by a logical output from the conversion module.

According to a first embodiment, the conversion module is adapted to convert each M-PAM symbol into a binary word with size M−1, the values of the intensities of switched current sources being identical ($I_0$).

The conversion module is then adapted to convert each M-PAM symbol into a binary word comprising n bits in a first logical state and N−n bits in a complementary logical state, in which n is the level of the M PAM symbol.

Advantageously, the binary word is a thermometric code word.

According to a second embodiment, the conversion module is adapted to convert each M-PAM symbol into a binary word with size $\mu = \log_2(M)$, the intensities of switched current sources having values equal to $(I_0, 2I_0, \ldots, 2^{\mu-1}I_0)$, in which $I_0$ is a predetermined intensity value.

According to a variant of the second embodiment, the conversion module is adapted to convert each M-PAM symbol into a binary word with size $\mu=\log_2(M)$, the intensity of the switched light source connected to the logical output $m=0, \ldots, \mu-1$ of the conversion module being chosen such that the light power from the optical source is equal to $2^m \Phi_0$ in which $\Phi_0$ is a predetermined light power.

According to a first configuration, each of the branches is arranged in series between the optical source and the ground, each branch comprising a transistor and a resistor in series, the transistor base being connected to a corresponding logical output of the conversion module.

According to a second configuration, each branch comprising a group of transistors in parallel and a resistor in series, the bases of said transistors in said group being connected to the same logical output of the conversion module.

For example, the optical communication system is a Li-Fi system. The optical source is typically a LED.

BRIEF DESCRIPTION OF THE DRAWINGS

Other features and advantages of the invention will become clear after reading a preferred embodiment of the invention, given with reference to the appended figures among which.

DETAILED PRESENTATION OF PARTICULAR EMBODIMENTS

The following description applies to an emitter for an optical wireless communication system, for example a Li-Fi communication system. The optical source used by the emitter may be a LED source, a laser source, a VCSEL (Vertical-Cavity Surface-Emitting Laser) laser diode, or other. No assumption is made herein about the emission spectrum; the optical source may be monochromatic or it may emit in a wide spectral band. In particular, if the emitter is used for the uplink of a Li-Fi system, the optical source may be an infrared LED.

Figure 1:
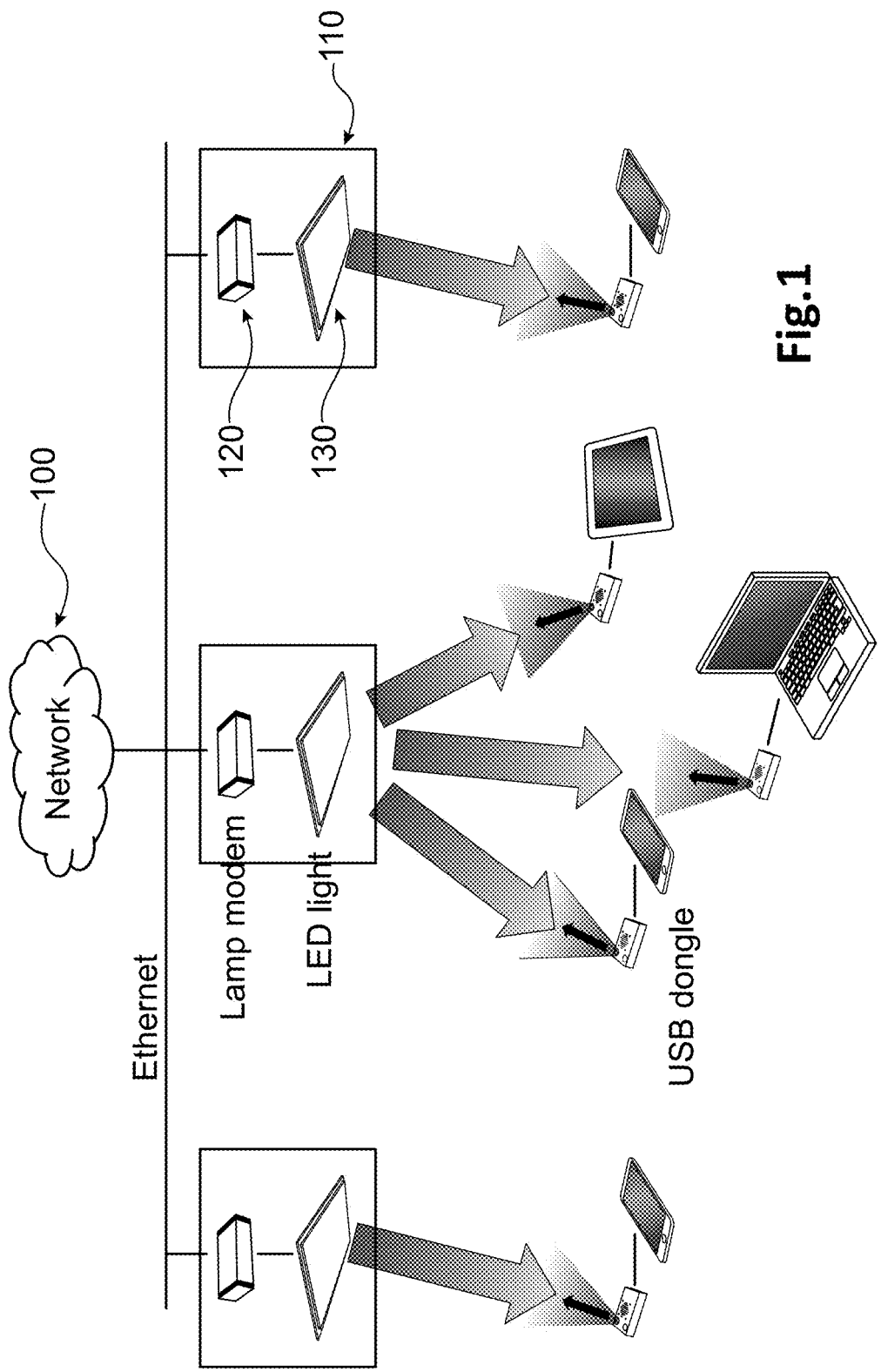
FIG. 1, already described, diagrammatically represents an example of a Li-Fi system known from the prior art.
Figure 2:
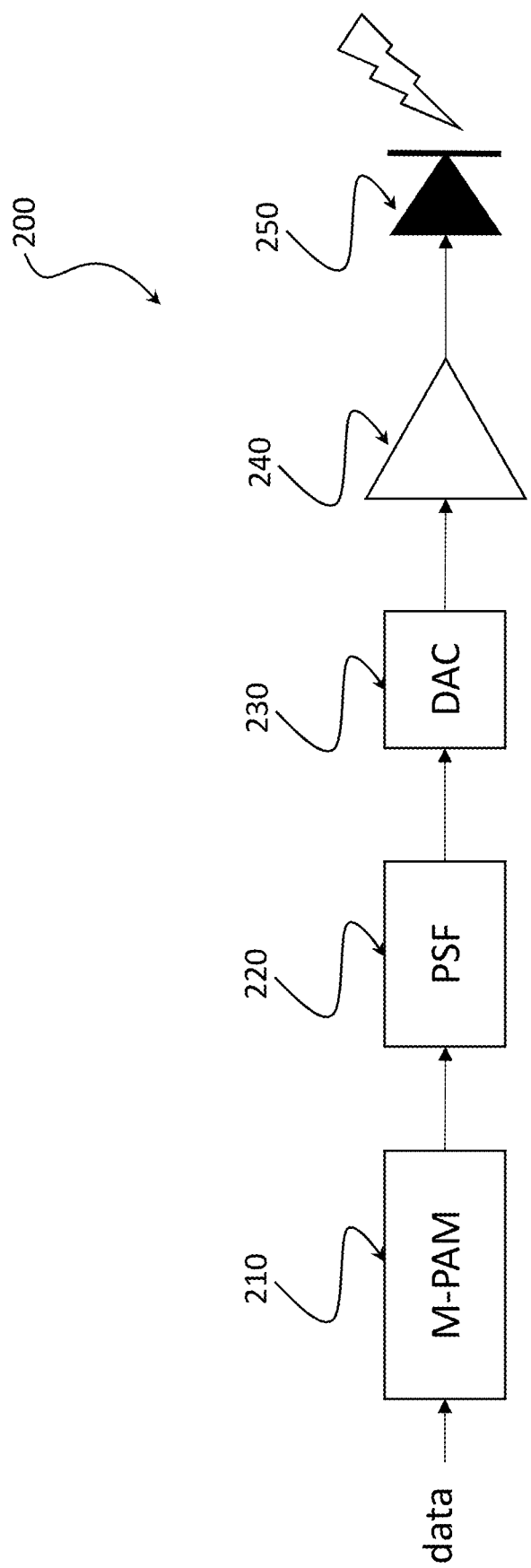
FIG. 2, already described, diagrammatically represents an emitter with M-PAM modulation for an optical wireless communication system known from the prior art.
Figure 3:
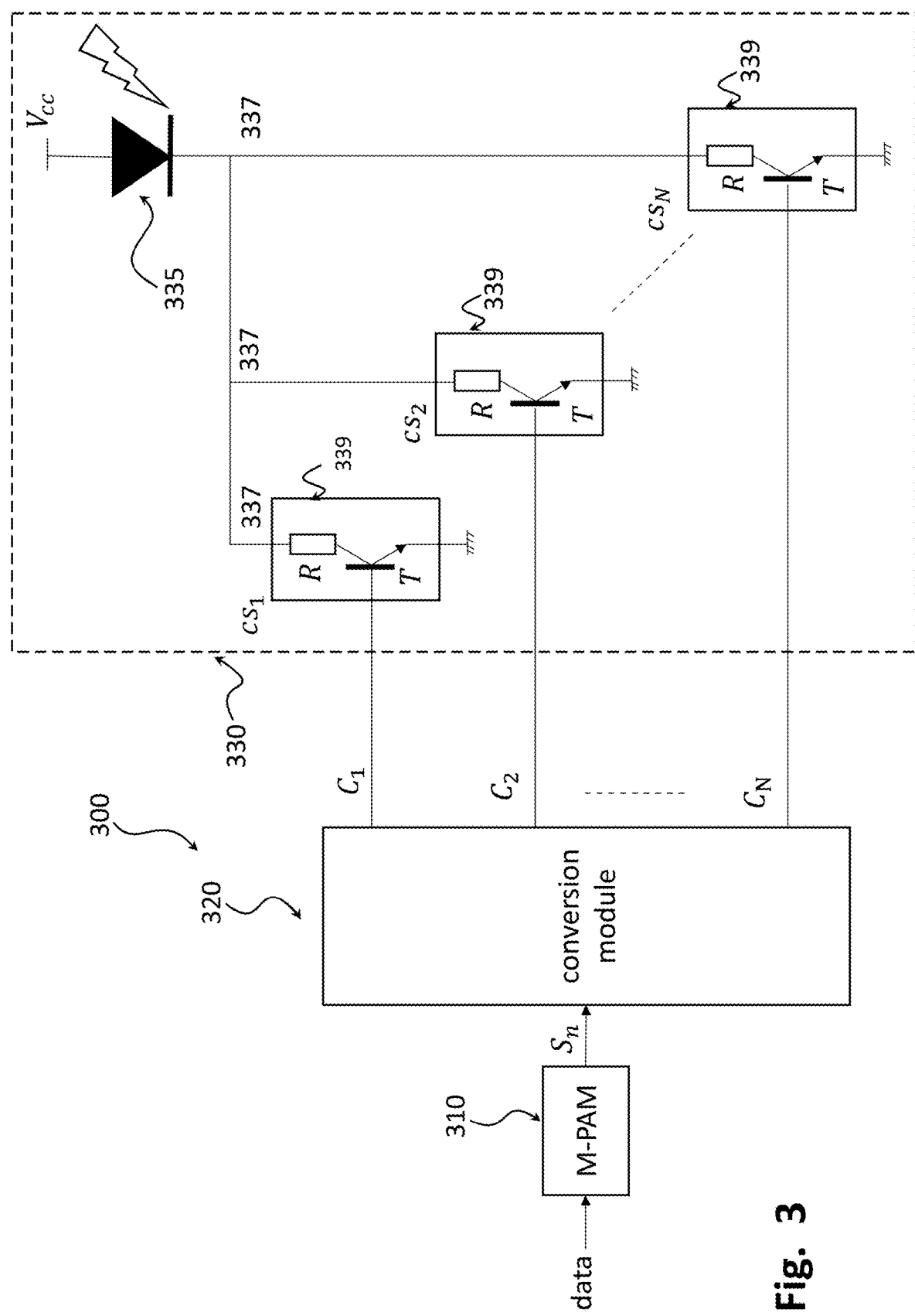
FIG. 3 diagrammatically represents the structure of an emitter with M-PAM modulation for an optical wireless telecommunication system, according to a first embodiment of the invention.

FIG. 3 diagrammatically represents the structure of an emitter with M-PAM modulation for an optical wireless telecommunication system, according to a first embodiment of the invention.

The emitter 300 comprises an M-PAM modulator, 310, modulating the binary data into M-PAM symbols. More precisely, each binary word (with maximum size $\log_2(M)$) is transformed by the modulator into an M-PAM symbol. The M-PAM symbols are then input into a conversion module, 320, that makes a binary word with N bits comprising n bits in a first logical state and N−n bits in a complementary logical state correspond to an M-PAM modulation symbol $S_n$, $0 \leq n \leq N$, in which N=M−1 (where M is the size of the PAM alphabet).

The following gives an example of a conversion table for the case M=8 (N=7):

| 8-PAM symbol | $C_1$ | $C_2$ | $C_3$ | $C_4$ | $C_5$ | $C_6$ | $C_7$ |
|---|---|---|---|---|---|---|---|
| $S_0$ | 0 | 0 | 0 | 0 | 0 | 0 | 0 |
| $S_1$ | 1 | 0 | 0 | 0 | 0 | 0 | 0 |
| $S_2$ | 1 | 1 | 0 | 0 | 0 | 0 | 0 |
| $S_3$ | 1 | 1 | 1 | 0 | 0 | 0 | 0 |
| $S_4$ | 1 | 1 | 1 | 1 | 0 | 0 | 0 |
| $S_5$ | 1 | 1 | 1 | 1 | 1 | 0 | 0 |
| $S_6$ | 1 | 1 | 1 | 1 | 1 | 1 | 0 |
| $S_7$ | 1 | 1 | 1 | 1 | 1 | 1 | 1 |

The 8-PAM symbols at the input are denoted $S_0, \ldots, S_7$ and the output word from the conversion module is denoted $C_1, \ldots, C_7$. It will be noted that the bits in the output word with the first logical value (or the complementary logical value) are not necessarily contiguous in the above example but they can occupy arbitrary positions.

The M-PAM modulator, 310, and the conversion module, 320, are advantageously made using an FPGA programmable circuit or an ASIC type dedicated integrated circuit, or even using a digital signal processor DSP.

According to one particular embodiment, the combination of the M-PAM modulator, 310, and the conversion module, 320, is made using a binary thermometric transcoder, encoding binary words with $\log_2(M)$ bits into words with N bits. It will be remembered that the alphabet of a thermometric code on N bits is composed of M mots, each word being composed of $0 \leq n \leq N$ LSB bits with a first logical value (for example "1"), the N−n MSB bits having a complementary value. Thus, for example, for M=8, the binary word "101" is encoded "0011111".

Regardless of the envisaged embodiment, each logical output $C_1, \ldots, C_N$ of the conversion module controls a switched current source, $cs_1, \ldots, cs_N$, of an optical generator module, 330. This optical generator comprises an optical source, for example a LED, 335 and a plurality N of parallel branches, 337, each of these branches being arranged in series with the optical source between a power supply source $V_{cc}$ and the ground. Each branch 337 comprises a switched current source, 339, through a logical output of the conversion module 320. For example, each branch comprises a transistor T operating in saturated-blocked mode, mounted in series with a resistor R. The transistor may be a bipolar transistor or a MOS transistor. The characteristics of transistors (T) and values of resistors (R) are chosen to be identical in each branch. Thus, all current sources generate an identical current $I_0$ and the emission current from the optical source (for example IR LED) can vary from 0 to $NI_0$ as a function of the data to be emitted. However, if the characteristics of transistors in the different branches are not precisely the same, a resistor calibration phase can advantageously be included such that the currents generated by switched current sources are nevertheless identical.

Each switched current source can be made by putting a group of transistors in parallel, if the saturation current of a single transistor is found to be insufficient. In this case, a logical output from the conversion module controls the bases of transistors in said group in parallel.

It will be noted that, unlike prior art, the optical emitter only requires a single light source, the elementary intensities being added in the electrical domain and not in the optical domain.

Figure 4:
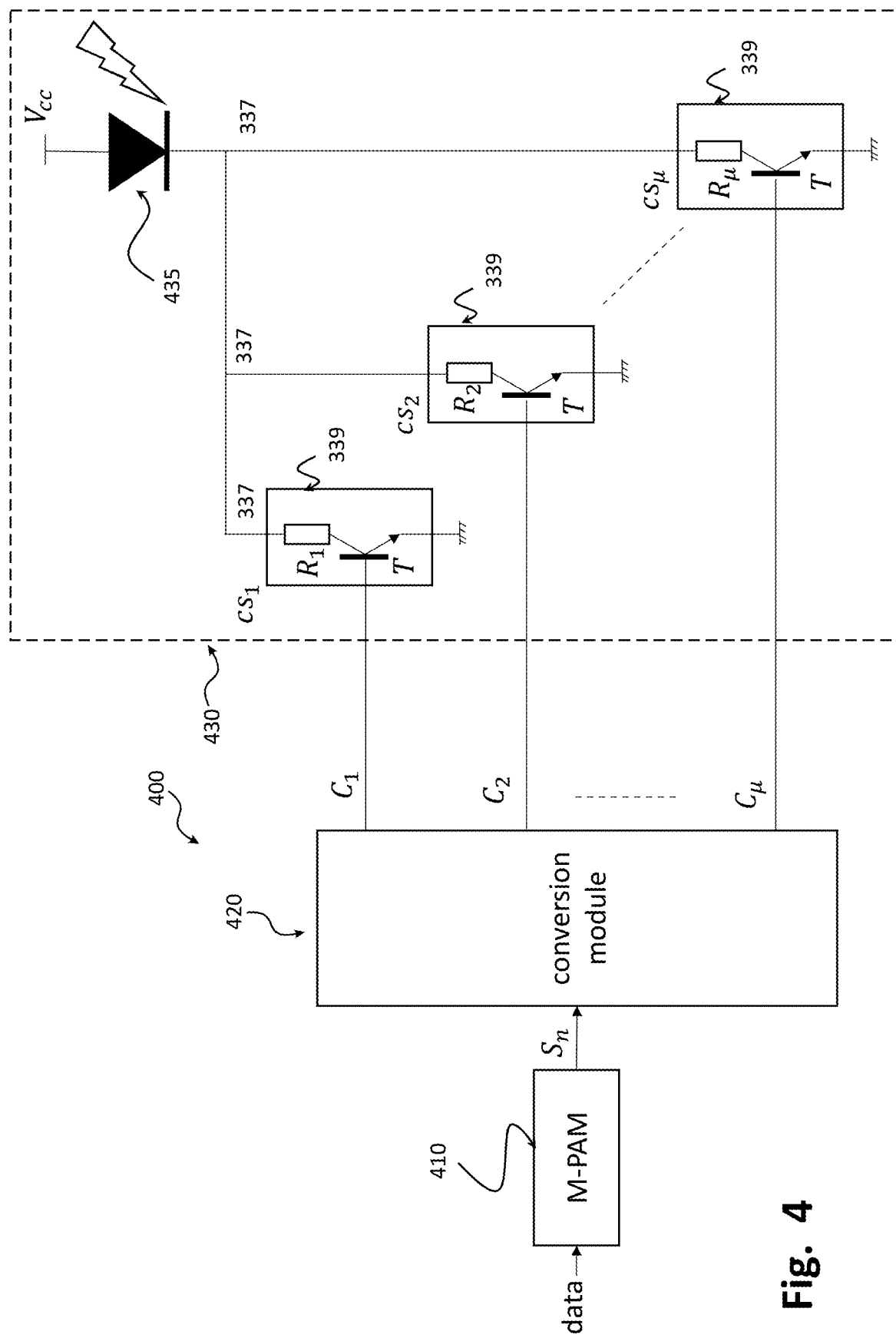
FIG. 4 diagrammatically represents the structure of an emitter with M-PAM modulation for an optical wireless communication system, according to a second embodiment of the invention.

FIG. 4 diagrammatically represents the structure of an emitter with M-PAM modulation for an optical wireless telecommunication system, according to a second embodiment of the invention.

This embodiment is different from the first embodiment in that the logical outputs from the conversion module are weighted and in that the currents in the different branches are also weighted.

More precisely, the optical emitter comprises an M-PAM modulator, 410, and a conversion module 420. The conversion module, 420, making a binary word with $\mu=\log_2(M)$ bits correspond to each M-PAM modulation symbol, $S_n$, $0 \leq n \leq N$, in which $N=M-1$.

As in the first embodiment, the M-PAM modulator, 410, and the conversion module, 420, are advantageously made using an FPGA programmable circuit or an ASIC type dedicated integrated circuit, or even using a digital signal processor DSP.

According to one example, the conversion module can use a particularly simple conversion table in which the modulation level n expressed in binary on $\mu=\log_2(M)$ bits, $C_1, \ldots, C_\mu$, is made to correspond to each symbol $S_n$.

Thus, for the case M=8:

| 8-PAM symbol | $C_1$ | $C_2$ | $C_3$ |
|---|---|---|---|
| $S_0$ | 0 | 0 | 0 |
| $S_1$ | 1 | 0 | 0 |
| $S_2$ | 0 | 1 | 0 |
| $S_3$ | 1 | 1 | 0 |
| $S_4$ | 0 | 0 | 1 |
| $S_5$ | 1 | 0 | 1 |
| $S_6$ | 0 | 1 | 1 |
| $S_7$ | 1 | 1 | 1 |

In this particularly simple example embodiment, the combination of the M-PAM modulator and the conversion module can be made by a simple series/parallel converter, 3 successive modulator input bits forming an output word from the conversion module. Obviously, other conversion tables are possible by changing over the rows and/or columns of the above table.

Regardless of the envisaged conversion table, each logical output $C_1, \ldots, C_\mu$ of the conversion module controls a switched current source, $cs_1, \ldots, cs_\mu$, of an optical generator module, 430. Unlike the previous embodiment, the switched current sources have different intensities, the switched current source $cs_m$, $m=1, \ldots, \mu$ generating a current with intensity $2^{m-1}I_0$ in which $I_0$ is the current generated by the current source $cs_1$, associated with the LSB of the output word from the conversion module.

As before, the optical generator 430 comprises an optical source 435 (for example a LED) and a plurality of parallel branches, 437, each of these branches being arranged in series with the optical source between a power supply source $V_{cc}$ and the ground. However, unlike the first embodiment, the number of branches in this case is equal to $\mu$. A branch m comprises a current source 439 designated by $cs_m$, switched by $C_m$, and with intensity $2^{m-1}I_0$. The switched current source can be made by a transistor operating in saturated-blocked mode in series with a resistor $R_m$. Resistance values $R_m$ are determined, possibly during a calibration phase, such that currents generated by $cs_1, \ldots, cs_\mu$ are equal to $I_0, 2I_0, \ldots, 2^{\mu-1}I_0$. Thus, emission current sources from the optical source (for example IR LED) can vary from 0 to $NI_0$ as a function of the data to be emitted.

Alternatively, according to a variant of the second embodiment, currents from switched current sources are chosen such that the light intensity of the optical source takes on values equal to $\Phi_0, 2I_0, \ldots, 2^{\mu-1}\Phi_0$ (in which $\Phi_0$ is a predetermined light power), when current sources $cs_1, \ldots, cs_\mu$ respectively are activated, to take account of non-linearities, if any, in the optical source. To achieve this, the resistances are adjusted accordingly in a calibration phase, the resistance $R_m$, $m=0, \ldots, \mu-1$ being chosen such that the light intensity of the optical source is equal to $2^m\Phi_0$ when the current source $cs_m$ is activated and other current sources are cut off.

It is important to note that the emitter according to the first or the second embodiment can also use a second modulation in addition to the M-PAM modulation. For example, it would be possible for the logical outputs controlling switching of current sources to also be modulated in Pulse Position Modulation (PPM) to provide an additional degree of modulation or in Pulse Width Modulation (PWM) so as to obtain a variation of the degree of lighting.

Furthermore, in the first embodiment and also in the second embodiment, it is possible to not use the control word $C_1=C_2=\ldots C_N=0$ (corresponding to a zero current intensity) to code a PAM symbol, so as to make a distinguish between the symbol in question and a lack of transmission, for example due to a failure.

The invention claimed is:

1. An emitter for an optical wireless communication system comprising:
   an M-PAM modulator configured to transform data to be transmitted into PAM (Pulse Amplitude Modulation) alphabet symbols with M levels in which M>2;
   an optical source configured to transmit said data;
   conversion circuitry configured to convert each M-PAM symbol into a plurality of logical outputs, using a conversion table; and
   a plurality of branches in parallel, each branch comprising a switched current source, mounted in series with the optical source, each switched current source being controlled by a logical output from the conversion circuitry, wherein
   the conversion circuitry is configured to convert each M-PAM symbol into a binary word with size $\mu=\log_2(M)$, and wherein outputs of the switched current sources are respectively equal to $(I_0, 2I_0, \ldots, 2^{\mu-1}I_0)$, in which $I_0$ is a predetermined intensity value.

2. The emitter according to claim 1, wherein each of the branches is arranged in series between the optical source and ground, each branch comprising a transistor and a resistor in series, a gate of the transistor being connected to a corresponding logical output of the conversion circuitry.

3. The emitter according to claim 2, wherein a resistance of the resistor of each branch is determined to calibrate an output current of the respective switched current source.

4. The emitter according to claim 1, wherein each of the branches is arranged in series between the optical source and ground, each branch comprising a group of transistors in parallel and a resistor in series, and gates of said transistors in said group being connected to the same logical output of the conversion circuitry.

5. The emitter according to claim 1, wherein the optical wireless communication system is a Li-Fi system.

6. The emitter according to claim 5, wherein the optical source is a LED.

7. An emitter for an optical wireless communication system comprising:
   an M-PAM modulator configured to transform data to be transmitted into PAM (Pulse Amplitude Modulation) alphabet symbols with M levels in which M>2; an optical source configured to transmit said data;

conversion circuitry configured to convert each M-PAM symbol into a plurality of logical outputs, using a conversion table; and a plurality of branches in parallel, each branch comprising a switched current source, mounted in series with the optical source, each switched current source being controlled by a logical output from the conversion circuitry, wherein the conversion circuitry is configured to convert each M-PAM symbol into a binary word with size $\mu=\log_2(M)$, and wherein an output of a switched current source connected to a logical output $m=0, \ldots, \mu-1$ of the conversion circuitry is chosen such that light power from the optical source is equal to $2^m \Phi_0$ in which $\Phi_0$ is a predetermined light power.

8. The emitter according to claim 7, wherein each of the branches is arranged in series between the optical source and ground, each branch comprising a transistor and a resistor in series, a gate of the transistor being connected to a corresponding logical output of the conversion circuitry.

9. The emitter according to claim 8, wherein a resistance of the resistor of each branch is determined to calibrate the light power from the optical source in series with the respective switched current source.

10. The emitter according to claim 7, wherein each of the branches is arranged in series between the optical source and ground, each branch comprising a group of transistors in parallel and a resistor in series, and gates of said transistors in said group being connected to the same logical output of the conversion circuitry.

11. The emitter according to claim 7, wherein the optical wireless communication system is a Li-Fi system.

12. The emitter according to claim 11, wherein the optical source is a LED.

* * * * *